United States Patent
Smith

[15] 3,669,078
[45] June 13, 1972

[54] LIVESTOCK TREATER
[72] Inventor: Wayne H. Smith, Leoti, Kans. 67861
[22] Filed: Aug. 31, 1970
[21] Appl. No.: 68,149

[52] U.S. Cl. ............................................................. 119/157
[51] Int. Cl. ................................... A01k 13/00, A01k 29/00
[58] Field of Search .......................................... 119/157, 156

[56] References Cited

UNITED STATES PATENTS

| | | | |
|---|---|---|---|
| 1,291,367 | 1/1919 | Barhite | 119/157 |
| 1,050,712 | 1/1913 | Applegate | 119/157 |
| 1,818,419 | 8/1931 | Miller | 119/157 X |
| 3,038,445 | 6/1962 | Fleming | 119/157 |

Primary Examiner—Hugh R. Chamblee
Attorney—John H. Widdowson

[57] ABSTRACT

The invention is a livestock treater. It has a frame with a reservoir mounted thereon. A dipper within the reservoir is turnably connected to a rubbing device, preferably a portion of the frame connected to the dipper. More particularly, the invention is a cattle treater having a rotatable rubbing device integral with the supporting frame for a reservoir and integral with a dipper operable to remove liquid from the reservoir and transfer the same to the rubbing device.

5 Claims, 7 Drawing Figures

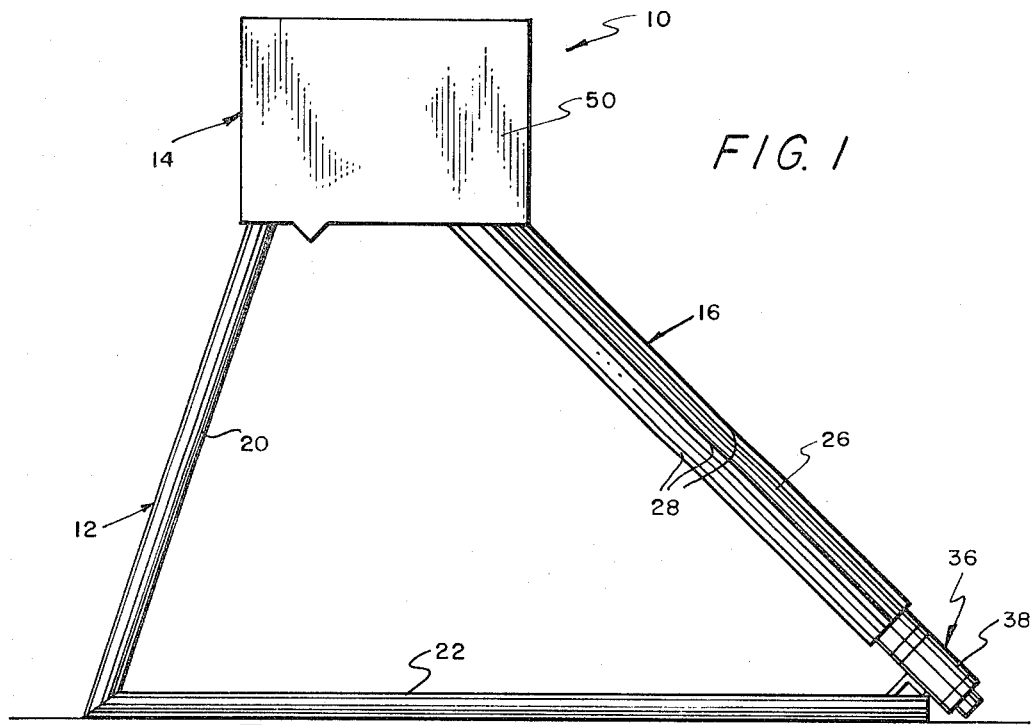
FIG. 1
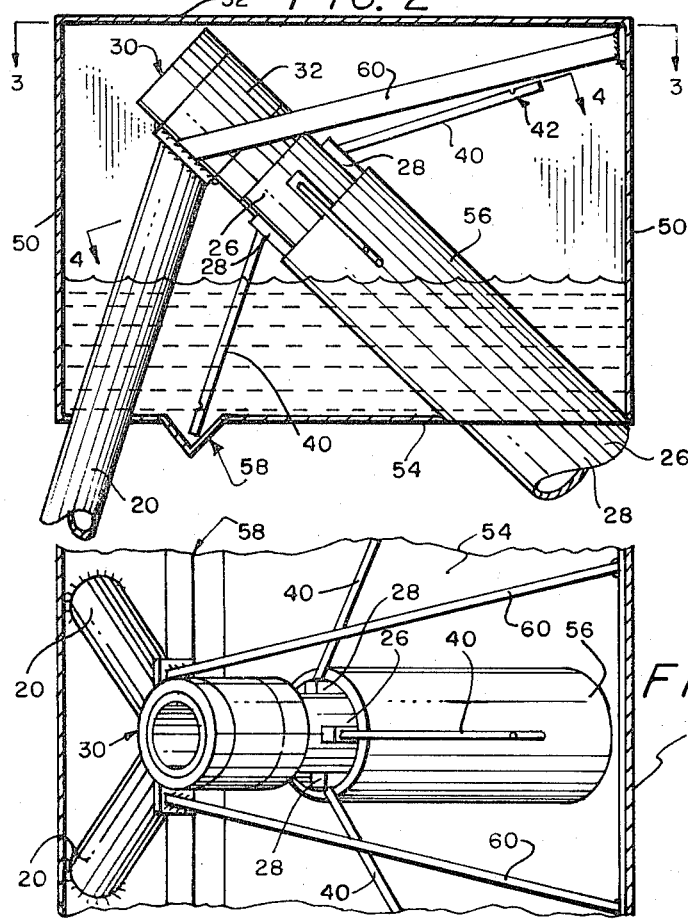
FIG. 2
FIG. 3
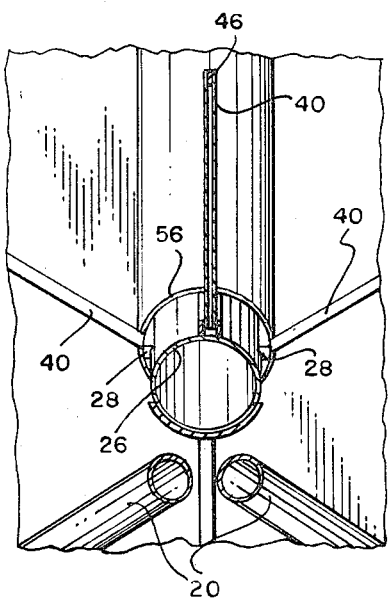
FIG. 4
INVENTOR
WAYNE H. SMITH
BY
John H. Widdowson
ATTORNEY

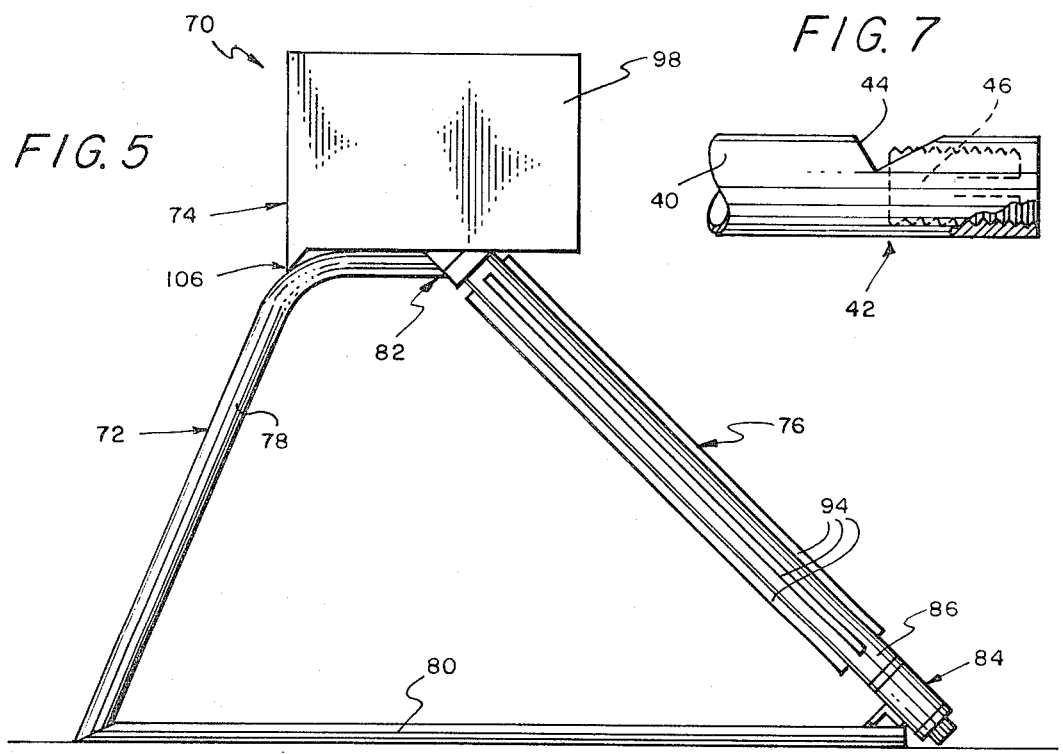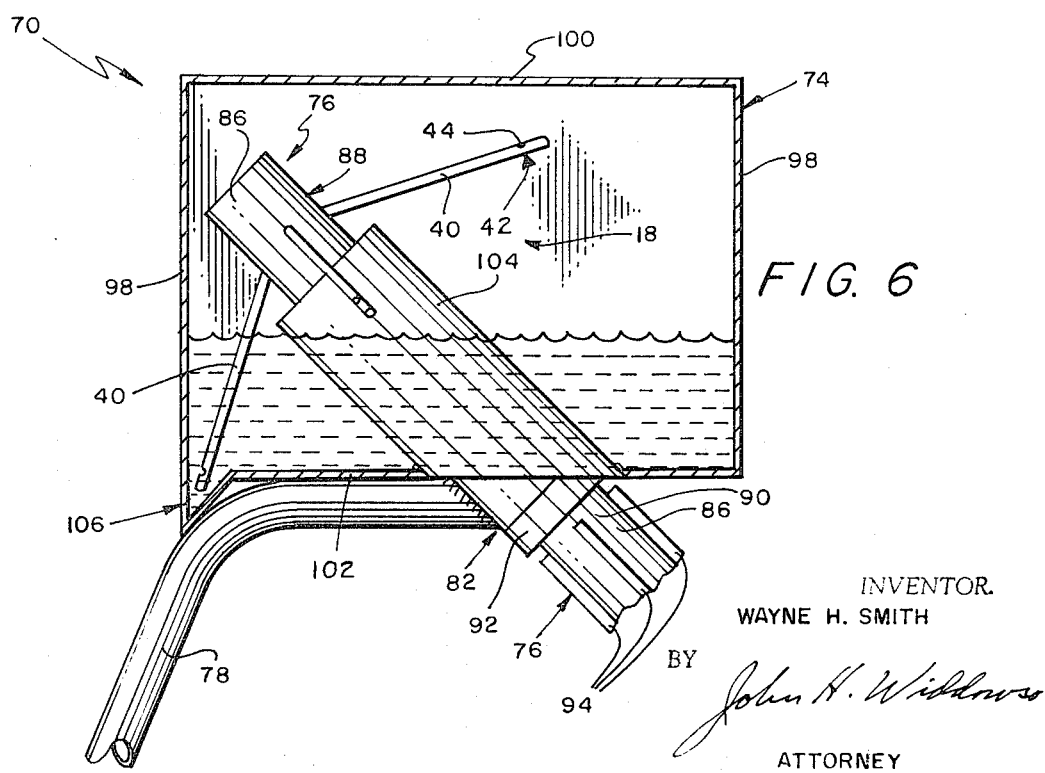

LIVESTOCK TREATER

Numerous types of livestock treaters are known in the prior art as operable to dispense oil or other liquids onto a rubbing device of some sort. Heretofore these livestock treaters have had complicated and intricate pumps or pumping devices including lift type piston pumps operated by cables and linkages, piston pumps operated from eccentrics and wheellike dipper dispensers operated in a rotating ratchet motion. Each of the prior art devices has a substantial amount of plumbing, valves, etc., which by their inherent nature of having numerous moving parts are prone to short lives without maintenance or replacement and are subject to damage upon rough treatment of the treater by the livestock.

In the herein described preferred specific embodiments of this invention a livestock treater is provided operable to hold a quantity of liquid and dispense it through a rotating dipper device having no moving parts and mounted on a rotatable rubbing device. The cattle treater of this invention includes a frame having legs supporting a reservoir thereabove with one of the legs being a rotatable rubbing device, and including a dipper device mounted to rotate inside the reservoir and with the rubbing device. In one preferred specific embodiment of the herein described invention, the reservoir is mounted on the apex of a three legged frame with the rubbing device mounted below the reservoir and the dipper device extending into the reservoir. In another preferred specific embodiment of the herein described invention the rubbing device is rotatably mounted at the apex of the frame with the dipping device attached therebelow, and the reservoir constructed around the apex. In general the livestock treater of this invention is adapted to pick up liquid in the reservoir with the dipping device and transfer it to the rubbing device when cattle rub against the rubbing device rotating it.

One object of this invention is to provide a livestock treater overcoming the aforementioned disadvantages of the prior art devices.

Still, another object of this invention is to provide a livestock treater having a frame structure supporting a liquid reservoir with a rotatable leg of the frame functioning as a rubbing device to transfer liquid to the animals.

Still another object of this invention is to provide a livestock treater having a dipper device with a plurality of elongated conduit members attached to the rubbing device and extending radially therefrom, operable on rotation of the rubbing device to dip liquid from the reservoir and dispense it to the rubbing device as animals rub against it, rotating it and the dipper.

Yet another object of this invention is to provide a livestock treater having a dipping device which operates to dispense liquid from the reservoir and simultaneously agitate the liquid in the reservoir.

Still an additional object of this invention is to provide a livestock treater which is attractive in appearance, durable in construction and simple in operation and has only one moving part.

Various other objects, advantages, and features of the invention will become apparent to those skilled in the art from the following discussion, taken in conjunction with the accompanying drawings, in which:

FIG. 1 is a side elevational view of one preferred specific embodiment of the livestock treater having the rubbing device rotatably mounted within the reservoir;

FIG. 2 is a side elevational view of the upper portion of the livestock treater shown in FIG. 1 with a portion of the reservoir cut away;

FIG. 3 is a view taken on line 3—3 of FIG. 2 of a segment of the upper portion of the livestock treater shown in FIG. 1;

FIG. 4 is a partial cross sectional view of the dipper taken on line 4—4 of FIG. 2;

FIG. 5 is a side elevational view of a second preferred specific embodiment of the livestock treater having the rubbing device rotatably mounted below the reservoir;

FIG. 6 is a side elevational view of the upper portion of the livestock treater shown in FIG. 5 with a portion of the reservoir cut away; and FIG. 7 is a partially cut away side elevational view of the end portion of the dipper conduits.

The following is a discussion and description of preferred specific embodiments of the new livestock treater of this invention, such being made with reference to the drawings whereupon the same reference numerals are used to indicate the same or similar parts and/or structure. It is to be understood that such discussion and description is not to unduly limit the scope of the invention.

Referring to the drawings in detail and in particular to FIG. 1, one preferred specific embodiment, of the livestock treater of this invention is indicated generally at 10. This preferred specific embodiment of the invention includes a frame structure 12 supporting a reservoir 14 having the rubbing device 16 integral with the frame 12 and being rotatably mounted on one end within the reservoir 14, on the bottom end with the frame 12, and having a dipper device 18 mounted on the upper end thereof.

The frame structure 12 preferably includes two upright legs 20, three base members 22 and the rubbing device 16 arranged as forming the edges of a tetrahedron. This preferred arrangement of the frame structure 12 supports the rubbing device 16 as a leg from the upper apex of the tetrahedron and supports the reservoir 14 similarly. The legs 20 and base members 22 are conduitlike members for maximum strength and durability, also construction. It is to be understood that the preferred frame structure 12 described herein is not a critical feature of the invention and it can be constructed differently to perform the same function without limiting the scope of the invention.

The rubbing device 16 includes an elongated rubbing pipe 26 with scratcher members 28 attached therealong and the dipper device 18 attached to the upper end thereof. The rubbing pipe 26 is an elongated conduit mounted with the frame 12 on the upper and lower ends and freely rotatable. On the upper end of the rubbing pipe 26 the upright legs 20 join at a bearing assembly 30 adapted to accept the upper end of the rubbing pipe 26. The bearing assembly 30 has a collar member 32 attached to the junction of the upright legs. On the lower end of the rubbing pipe 26 the base members 22 join at a bearing assembly 36 having a collar member 38 adapted to accept the lower end of the rubbing pipe 26 so it can rotate freely. The scratcher members 28 are preferably U-shaped channel members attached to the rubbing pipe 26 with the normally open portion attached to the rubbing pipe 26 forming a passageway along the rubbing pipe 26. The passageway of the scratcher is attached to the rubbing pipe so liquid will leak and flow on to the rubbing pipe 26.

The dipper device 18 is mounted to the upper end of the scratcher members 28. The dipper device 18 consists of a small elongated conduit 40 rigidly cantilevered from each scratcher member 28 and having a valve assembly 42 on the unattached end of the elongated conduit. The dipper conduits 40 are positioned relative to the rubbing pipe 26 such that when the rubbing pipe 26 is rotated so a conduit 40 is on the top thereof any liquid inside it will flow to the attached end and into the scratcher member 28. The dipper valve 42 is shown in detail in FIG. 7. The dipper valve 42 is formed in the end portion of the dipper conduit 40 by a notch 44 in the upper portion of the conduit 40 and an insert screw 46 threadably engaged with the inside of the conduit end. The notch 44 is preferably formed as shown in FIG. 7 so the screw 46 can be positioned to regulate the flow of liquid into the dipper device 18.

In this preferred specific embodiment, (1), the reservoir 14 is constructed around the upper end portion of the rubbing device 16 and upright leg members 20, enclosing the bearing assembly 30 and dipper device 18. The reservoir has upright sidewalls 50, top 52 and a bottom 54 also an inlet, and a drain, not shown in the drawings. The bottom 54 of the reservoir 14 is formed around the upright leg members 20 and the rubbing device 16 and has a passageway 56 extending upward from the bottom 54 through the liquid and around the rubbing device 16 so it can rotate therein. A trough 58 is formed transversely across the bottom 54 of the reservoir 14 to provide a place for the liquid to collect and so the dipper conduits 40 to pass through and pick up the liquid. Sidewalls 50 of the reservoir are attached to brace members 60 which are mounted at the junction of the rubbing pipe 26 and the upright legs 20 for additional support.

In another preferred specific embodiment, (2), of the livestock treater of this invention the device is generally indicated at 70 and shown in FIG. 5. This preferred specific embodiment of the invention includes a frame 72 supporting a reservoir 74 with the rubbing device 76 integral with the frame 72 and supported below the reservoir 74 and having the dipper device 76 contained within the reservoir 74.

The frame 72 is preferably constructed in a general tetrahedral shape with two upright legs 78, three base members 80 and the rubbing device 76. The upright legs 78 are curved on the upper end thereof and have a horizontal portion turned under the reservoir 74 joining at a bearing assembly 82 mounting the rubbing device 76. The base members 80 are connected between the upright legs 78 and join at another bearing assembly 84 mounting at the lower end of the rubbing device 76. Both of the bearing assemblies 82 and 84 allow the rubbing device 76 to rotate freely and hold it in a fixed transverse position.

The rubbing device 76 is constructed with a rubbing pipe 86 extending from the lower bearing assembly 84 through the upper bearing assembly 82 and into the reservoir. The portion of the rubbing pipe 86 above the upper bearing assembly 82 mostly inside the reservoir 74 is a second reservoir 88. The dipper device 76 has a plurality of elongated conduit members similar to those of the aforedescribed preferred specific embodiment, (1), and referred to with the same numerals, 40, 42 and 46. The dipper conduits 40 of the herein described embodiment, (2), are cantilevered from the upper end of the rubbing pipe 86 and in operation dispense liquid into the second reservoir 88. The second reservoir 88 is the upper end portion of the rubbing pipe 86, it extends downward below the bearing assembly 82 a short distance and terminates at a plug inside the rubbing pipe, not shown in the drawings but indicated in position at 90. The second reservoir plug 90 is positioned below the stop collar 92 on the lower end of the bearing assembly and below the upper ends of the scratcher members 94. The scratcher members 94 are preferably channel members attached to function as similar scratcher members 28 described supra. The rubbing pipe 86 has apertures therethrough the second reservoir 88 and positioned under the upper end portions of the scratcher members 94. In operation these apertures allow liquid to flow from the second reservoir 88 into the scratcher members 94 whereupon it flows onto the rubbing pipe 86.

The reservoir 74 has upright sidewalls 98, top member 100 and bottom member 102 with an integrally formed passageway 104 for the rubbing device 76. The reservoir 74 preferably has an inlet and drain, not shown, to provide convenient filling and draining. The bottom 102 and one sidewall 98 substantially form an integral trough 106 extending below the bottom 102 of the reservoir 74. The trough is adapted to receive and pass the dipper conduits 40 as they are rotated in operation and provide a collecting point for liquid in the reservoir so substantially all of it can be removed. The rubbing device passageway 104 is a large conduit integrally attached to the bottom 102 positioned coaxiliar with the rubbing device 76 adapted to isolate the upper end portion of the rubbing device 76 and the upper bearing assembly 82 from the liquid contained in the reservoir. The passageway 104 permits the rubbing pipe 86 and dipper device 18 to rotate freely inside the reservoir 74.

Operationally both of the herein described preferred specific embodiments function similarly. As an animal rubs against the rubbing pipe 26 and 86, and the scratcher members 28 and 94, the animal rotates the rubbing pipe and rubs the liquid on his hide. At the same time the rubbing pipe turns the dipper device 18, picks up liquid from the reservoir 14 and 74, and transfers it to the rubbing pipe to replenish the liquid as it is rubbed off. The scratcher members provide means for the animals to scratch themselves thereby rubbing the liquid into their hide this also provides some leverage to insure easy turning of the rubbing pipe. An additional function of the dipper device is to agitate the liquid as it turns, this can prevent the liquid from clotting or becoming thickened such that it will not flow properly. The livestock treater of this invention is adapted to dispense liquid which can include insecticides, oils, or liquid mixtures of various kinds which are normally applied to livestock such as for control of flies, lice, etc. or in the administering of medication.

In the use and operation of the livestock treater of this invention it is seen that same provides a durable structure due to the configuration and the single movable part. The structure is constructed such that animals can easily rub against the rubbing device in many positions to rub the liquid on most areas of their bodies.

Also, the rubbing device functions to dispense the liquid and simultaneously agitate it upon rotation by means of the attached dipper device.

In the manufacture of the livestock treater, (1 and 2) in the preferred specific embodiments disclosed herein, it is preferable that the structure is constructed having sufficient weight to prevent movement of it by animals rubbing against it. Also, the reservoir is constructed to contain a substantial amount of liquid so the livestock treater can be used for a substantial period of time without need of refilling.

As will be apparent from the foregoing description of the applicant's livestock treater, relatively inexpensive means have been provided to dispense liquid from a reservoir to livestock as they rub their bodies against the rubbing device. The livestock treater structure is economical to manufacture, simple in operation, has a minimum of movable parts; it can be easily refilled and requires negligible maintenance.

While the invention has been described in conjunction with preferred specific embodiments thereof, it will be understood that this description is intended to illustrate and not limit the scope of the invention, which is defined by the following claims.

I claim:

1. A livestock treater comprising:
   a. a frame means having a plurality of leg members one of which is a turnable rubbing means,
   b. a reservoir means mounted in the upper portion of said frame means and having said rubbing means extending downward angularly therefrom,
   c. a dipper means therein said reservoir means and having a plurality of elongated conduits attached to the upper end portion of said rubbing means extending therefrom adapted in operation to receive liquid from said reservoir and transfer same to said rubbing means, and said rubbing means connected to said dipper means to turn same, and
   d. said reservoir is a container structure and has said dipper means contained therein positioned substantially above the liquid,
in operation said livestock adapted to contain liquid in said reservoir, and to dip liquid from said reservoir by said dipper means and disperse same onto said rubbing means upon turning said rubbing means and said dipper means.

2. The livestock treater as described in claim 1, wherein:
   a. said rubbing means has a rotatable outer rubbing member supported by the end portions thereof mounted with said frame means and substantially covering one of said leg members, and
   b. said outer rubbing means has means to receive and disperse the liquid.

3. The livestock treater as described in claim 2, wherein:
   a. said means to receive and disperse said liquid is a plurality of scratcher members mounted thereon and substantially extending the length thereof said outer rubbing member,
   b. said elongated conduit members are attached to said outer rubbing member to rotate therewith and extend outward and angularly downward therefrom relative said outer rubbing member, and c. said elongated conduit members each have a valve on the outer end portion thereof, said outer end portion of said conduit members are in operation adapted to pass into the liquid in a lower position, receive same therethrough said valve and rotate therefrom to an upper position such that liquid will pass by gravity flow through said conduit to said scratcher members.

4. The livestock treater as described in claim 2, wherein:

a. said dipper means is attached to the upper end of said scratcher means, and b. said rubbing means is rotatably mounted on the upper end thereof said frame means joining said leg members and has said end thereof contained within said reservoir.

5. The livestock treater as described in claim 2, wherein:

a. said rubbing means has the upper end portion thereof contained within said reservoir means, said rubbing means is rotatably mounted below said reservoir means, b. said upper end portion of said rubbing means is a second reservoir means, and c. said scratcher members are connected to said second reservoir means.

* * * * *

UNITED STATES PATENT OFFICE
CERTIFICATE OF CORRECTION

Patent No. 3,669,078    Dated June 13, 1972

Inventor(s) Wayne H. Smith

It is certified that error appears in the above-identified patent and that said Letters Patent are hereby corrected as shown below:

Column 4, line 59, after "livestock" insert -- treater -- ; line 68, "means" should read -- member -- . Column 5, line 6, "lower" should read -- lowered -- .

Signed and sealed this 12th day of December 1972.

(SEAL)
Attest:

EDWARD M. FLETCHER, JR.  
Attesting Officer

ROBERT GOTTSCHALK  
Commissioner of Patents